Figure 1:
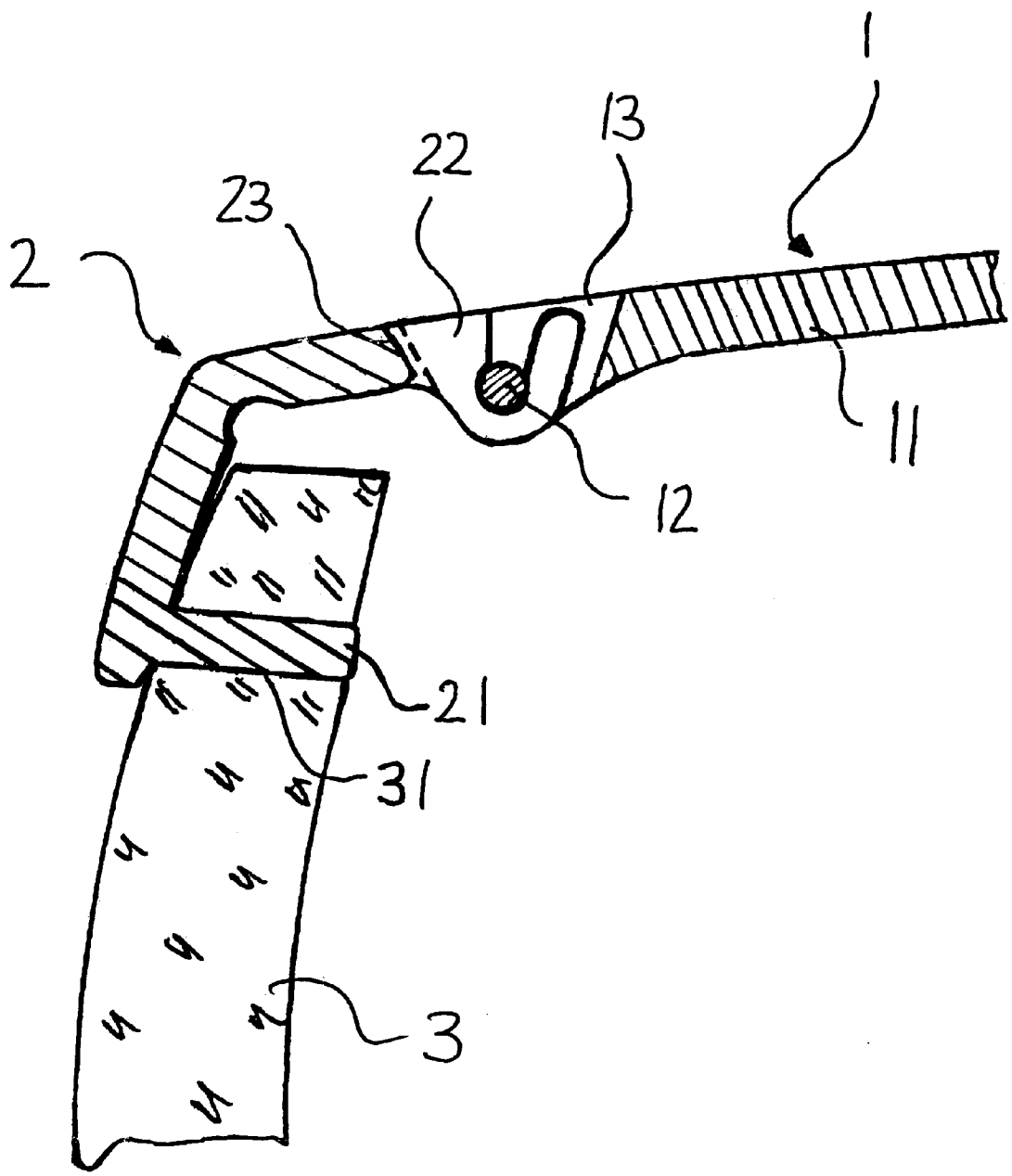

United States Patent [19]
Schmid et al.

[11] Patent Number: 5,980,039
[45] Date of Patent: Nov. 9, 1999

[54] BREAKAWAY HINGE FOR EYEGLASSES

[75] Inventors: Rudolf Schmid, Balingen, Germany; Wilhelm Anger, Salzburg, Austria

[73] Assignee: Hemaris GmbH, Chur, Switzerland

[21] Appl. No.: 09/083,254

[22] Filed: May 20, 1998

[30] Foreign Application Priority Data

May 21, 1997 [DE] Germany .................. 197 21 306

[51] Int. Cl.$^6$ ............................................. G02C 5/22
[52] U.S. Cl. ............................................. 351/153; 16/228
[58] Field of Search ............................... 351/153; 16/228

[56] References Cited

U.S. PATENT DOCUMENTS 5,418,581  5/1995  Conway .................. 351/153

Primary Examiner—Huy Mai
Attorney, Agent, or Firm—Roth & Goldman

[57] ABSTRACT

A hinge for glasses pivotably connects an endpiece (2) attached directly on a lens (3) or provided on a frame with a temple (1). The hinge has a hinge pin (12) held rotatably in a hinge support (22) of the endpiece (2), which hinge pin is disposed on the temple (1). The hinge pin (12) forms a predetermined breaking point (122) for the hinge, which releases the temple (1) when an admissible force on the endpiece (2) is exceeded. A preferred embodiment is described, according to which the hinge pin (12) is formed in one piece with the temple (1) in an injection molding process.

22 Claims, 3 Drawing Sheets

BREAKAWAY HINGE FOR EYEGLASSES

DESCRIPTION

The invention relates to a hinge for eyeglasses of the type known, for example, from the description of rimless glasses, Max Haase, Optiker-Taschenbuch, Wissenschaftliche Verlagsgesellschaft mbH Stuttgart, 6th ed. 1976, pp. 263ff and FIG. 219.

These glasses have a bracket, or so-called endpiece, which is applied directly to one lens of the glasses, whereby the attachment of the endpiece to the lens is accomplished by a screw or the like passing through the lens. The endpiece accommodates a hinge on which a temple is pivotably held.

Hinges for glasses with full-rim or half-rim frames are presented, for example, in DIN 5361. Such a customary hinge has hinge eyes on the endpiece side which can accommodate a hinge eye on the temple side between them such that the holes provided in the hinge eyes align with each other. One of the hinge eyes—usually the bottom one—is threaded such that a screw passing through the hinge eyes can be fastened in the hinge by means of the thread. It is alternatively common to provide a locknut to secure the screw in the hinge. The screw forms the hinge pin, which enables a rotational movement of the temple-side hinge eye relative to the endpiece-side hinge eyes. It is also possible to provide a plurality of hinge eyes on both sides of the hinge, i.e., on the endpiece side and the temple side; it is also possible for the temple-side hinge eyes to accommodate one or a plurality of endpiece-side hinge eyes.

With the use of such prior art hinges on glasses, an excessive strain on the hinge may result in the frame bending or breaking, in the lens falling out of the frame, or in the endpiece breaking out of the lens, which strain may readily occur upon the opening of the temple beyond the admissible angle or another strain on the hinge in or across its pivoting direction. In this process, not only the endpiece, but also the lens is frequently irreparably damaged such that such overloading of the hinge results in time-consuming and thus expensive repair because of the necessary exchanging of individually adapted lenses.

In contrast, the object of the invention consists in improving a hinge for glasses such that damages to the lens from forces acting on the temple are reliably avoided.

According to the invention, a hinge is provided with a hinge pin which forms a predetermined breaking point which releases the temple when an admissible force on the endpiece is exceeded. With this solution, it is possible, since the hinge pin can only transfer a predetermined force, to transfer this force as a maximum to the endpiece. If this force is exceeded, the hinge pin breaks at its predetermined breaking point and, consequently, releases the temple so that no further force can be transferred to the endpiece. Since now no force which is greater than the admissible force can act on the endpiece, damage to the endpiece itself and/or to the lens at the connection to the endpiece is reliably prevented. For this, the predetermined breaking point of the hinge pin must, of course, be designed appropriately weaker than the maximum admissible loadability of the endpiece or of the endpiece/glass connection. The same is true for the use of the invention on glasses with full-rim or half-rim frames. In this case, the predetermined breaking point of the hinge pin must be dimensioned such that the endpiece is not broken off or bent and that the frame of the glasses is not damaged or bent such that a lens held in the frame is released and damaged when it falls out.

If the temple has been released due to the action of a force, all that is necessary for the repair is to merely replace the hinge pin. Thus, the lenses, which are usually the most expensive elements of a pair of glasses, remain undamaged and do not have to be replaced.

The hinge pin may be designed as the predetermined breaking point in various ways. Thus, the hinge pin may have a local reduction of its diameter or be designed appropriately thin overall. Also, a fracture notch, at which the hinge pin preferably breaks, may be provided on the hinge pin.

Yet another possibility consists in producing the hinge pin from a material with low strength; in particular, brittle materials, such as ceramic or the like, which have low fracture resistance, may be used.

It is further possible to manufacture the hinge pin by injection molding, whereby the material faces which are injected into a mold during the injection molding process, should preferably extend from both ends of the hinge pin to the center of the hinge pin. Thus, an injection seam forms, preferably in the central zone of the hinge pin, at which the material faces coming from the two ends of the pin meet and cause a weakening of the hinge pin at this injection seam.

It is also possible to use combinations of the above possibilities. For example, the hinge pin may be injection molded with a weakening of the diameter or with a fracture notch, whereby an injection seam and the weakening or notch may cooperate to define the force necessary to break the hinge pin. The hinge pin may also be manufactured from a combination of different materials; it is, for example, possible to provide the aforementioned brittle or readily breaking low-strength material in one section of the hinge pin and to mold the rest of the hinge pin in injection molding.

The hinge pin designed according to the invention may be used analogously to the conventional hinge pin usually made up of a screw. Then, the hinge pin can have the form of a screw which has an appropriate predetermined breaking point and is inserted through the hinge eyes of a prior art hinge. The hinge pin may alternatively be guided through the hinge eyes and inserted. The hinge pin may further be glued in or provided with an appropriate notch such that the hinge pin can snap into a hinge eye.

The hinge pin does not necessarily have to have an essentially cylindrical shape; instead the cross-section of the hinge pin may be triangular or multiangular or have a different cross-sectional shape. There are also a plurality of possibilities for the shape of the long ends of the hinge pin. It is thus possible to provide a taper on one end of an insertion pin as a guide slope, or, as previously mentioned, a snap-in means may be provided on one end of the hinge pin. For ornamentation, the ends of the hinge pin may be provided with appropriate heads, screw heads, or decorative elements.

In the above description, the hinge pin has been described as a component for use in conventional hinges.

In an advantageous embodiment of the invention, the hinge support of the endpiece is designed in the shape of a hook and the hinge pin is disposed on the temple. This embodiment simplifies repair of the glasses because the replacement temple with the hinge pin disposed thereon may be simply inserted in the hinge support of the endpiece.

Although not explained in detail in the following, the hook-shaped hinge support may alternatively be provided on the temple and the hinge pin accordingly provided on the endpiece. The following description refers, however, to the first-mentioned case of placement of the hook-shaped hinge support on the endpiece. The second case results from the appropriate interchanging of the references of the terms temple and endpiece; so, no further explanation is necessary.

The hinge pin may be glued or clamped into the hook-shaped hinge support after insertion therein; in the process, the rotational movement of the temple relative to the endpiece is obtained by means of a pivotable accommodation of the hinge pin in the temple.

The hook-shaped hinge support is, however, preferably provided with a snap-in arrangement in a throat of the hook-shaped hinge support into which the hinge pin may be inserted essentially at a right angle to its longitudinal axis and then held therein by snapping. The snap-in arrangement is preferably designed such that the hinge pin snapped into it is prevented from coming out of the hook-shaped hinge support, but is held pivotably in the snapped position, such that it is possible to place the hinge pin non-rotatably on the temple.

With such a design, it is possible to preassemble the hinge pin solidly on the temple by simple gluing or insertion such that in the case of the breaking of the hinge pin, an exchange of the entire temple is made by insertion and snapping.

In an advantageous embodiment of the invention, the hinge pin is designed in one piece with the temple. This may be preferably achieved by injection molding of the temple along with the hinge pin, whereby the above-described injection seam may be provided on the hinge pin as a deliberate weakening of the hinge pin.

The temple obtained by an injection molding process is usually a reasonably priced part which may be exchanged as a spare part upon breakage of the hinge pin. The wearer of the glasses can make such an exchange himself if he has the appropriate spare part. To accomplish this, the hinge pin formed on the temple is inserted in the hook-shaped hinge support and the hinge pin is pivotably snapped into the throat of the hook-shaped hinge support to yield a repair capability which can be executed without any tool.

The invention is explained in detail in the following in a preferred exemplary embodiment with reference to the drawings. They depict:

FIG. 1 a sectional assembly drawing of an exemplary embodiment of the hinge as a hinge for rimless glasses, whereby the plane of the section is roughly perpendicular to the lenses of the glasses and runs approximately in the center of the temple.

Figure 2:
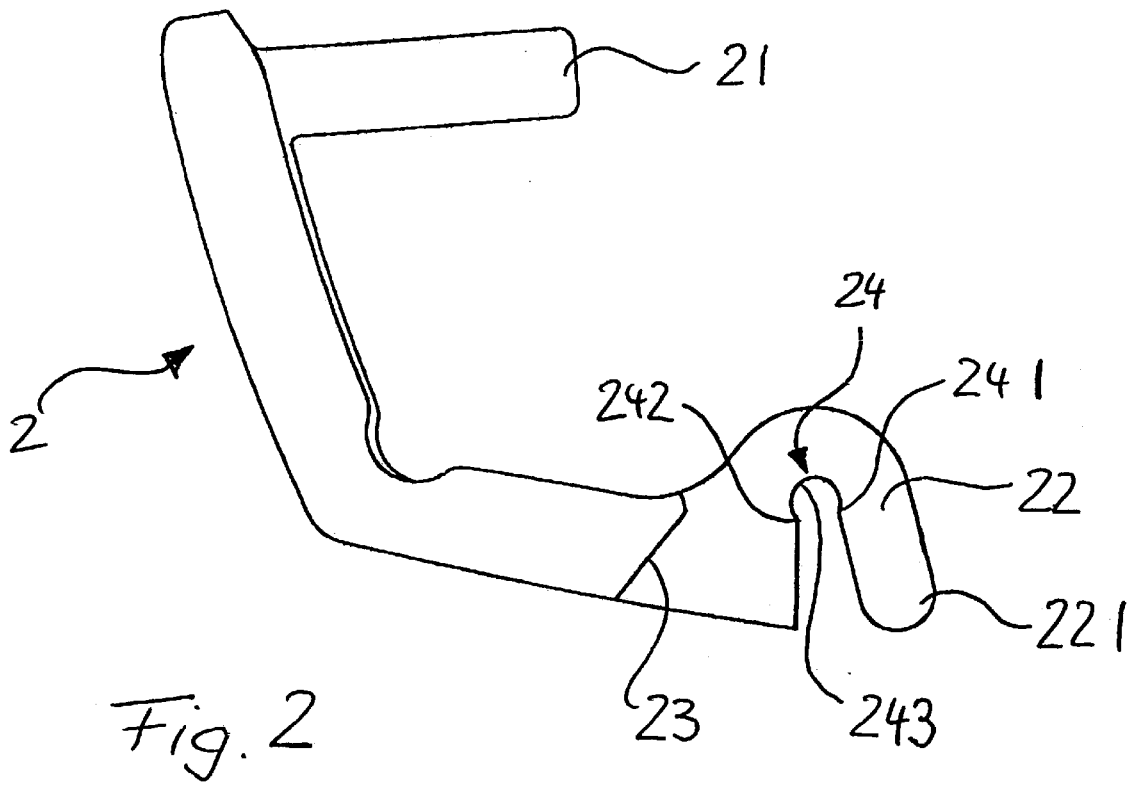
Figure 3:
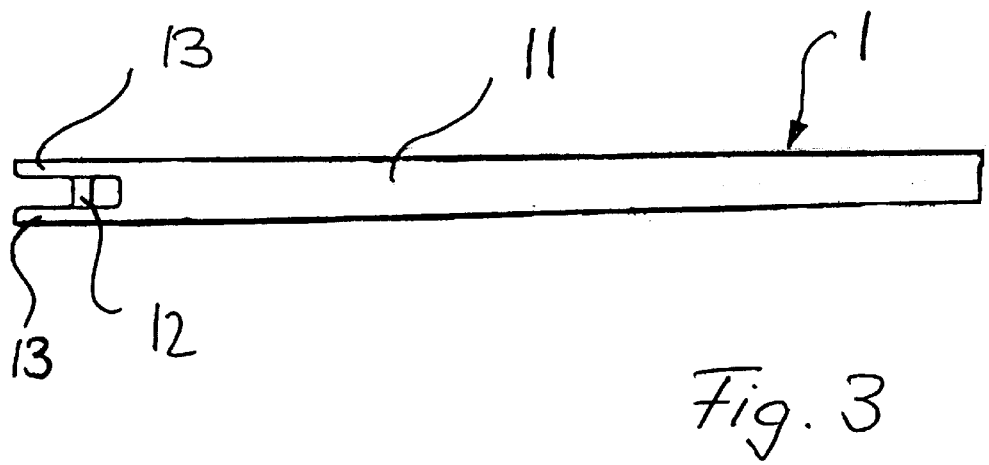
Figure 4:
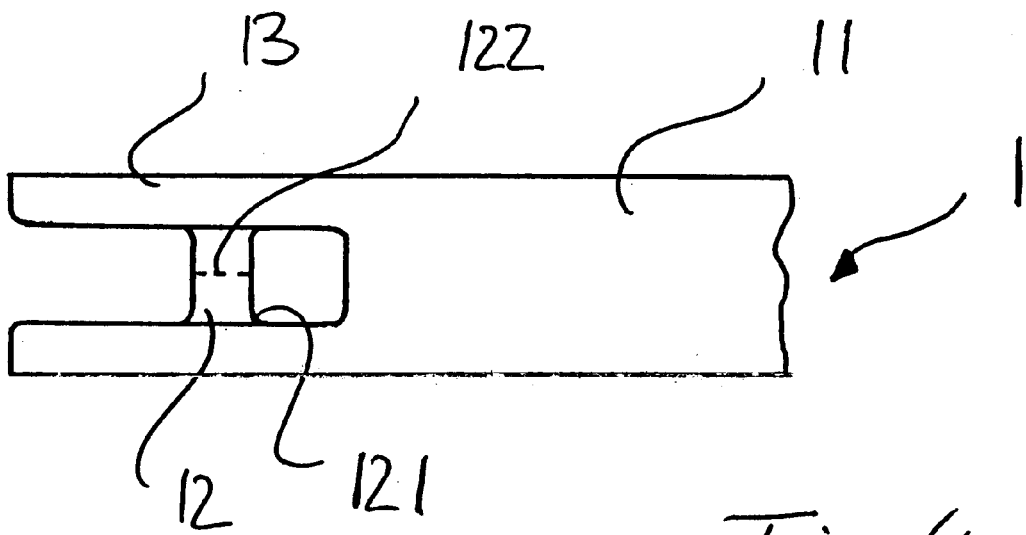
Figure 5:
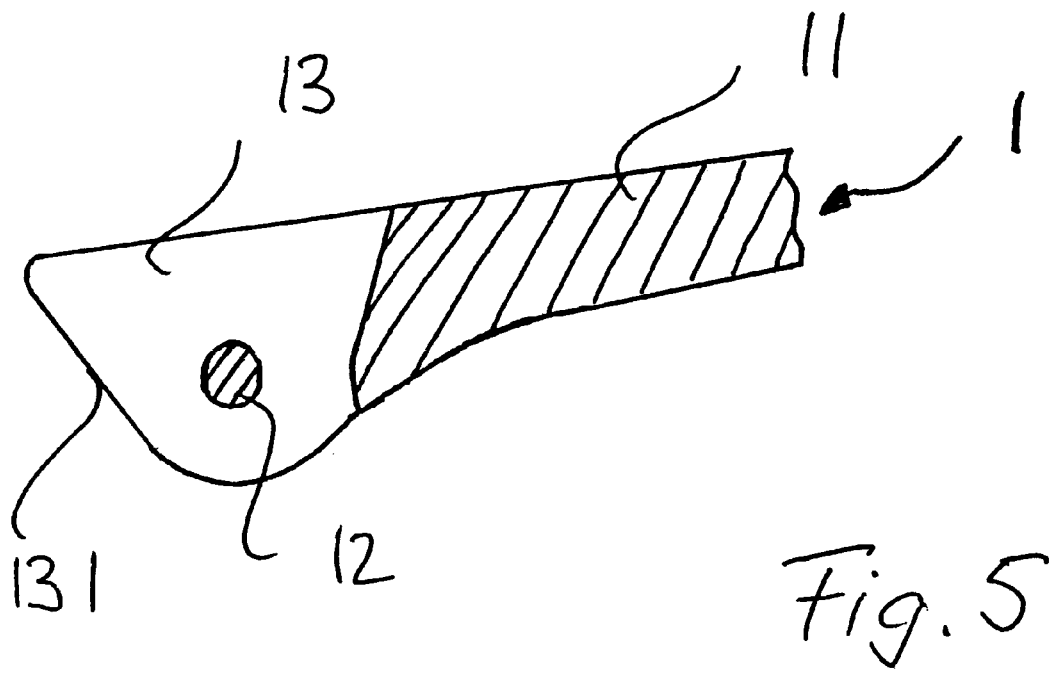

FIG. 2 a top view of an exemplary embodiment of a endpiece;

FIG. 3 a side view of an exemplary embodiment of a temple;

FIG. 4 an enlarged view of a section of the temple according to FIG. 3 to illustrate the temple-side part of the exemplary embodiment of the hinge; and FIG. 5 an enlarged sectional view of the section of the temple from FIG. 4, whereby the plane of the section corresponds roughly to that in FIG. 1.

According to FIG. 1, a temple identified as 1 has a temple body 11 which can run alongside the head of the wearer and is provided on the end opposite the hinge with a curved earpiece to secure the glasses behind the ears of the wearer. Alternatively, the temple body 11 may be executed as a straight temple, i.e., it has no curved earpiece on the end opposite the hinge, but simply runs parallel to the head of the wearer to rest on the wearer's ears. The body 11 of the temple may also have other shapes particularly suited to the purpose of the glasses. In particular, anatomically fitted temples or spring-elastic fiber temples, which are widely used with so-called sport glasses, are also possible.

The temple 1 also has two hinge sections 13, of which only one is depicted in FIG. 1 due to the path of the cutting plane. The hinge section 13 is bounded on the edge facing a endpiece 2 in FIG. 1 with a broken line which indicates that the hinge section 13 of the temple 1 in FIG. 1 is located under the endpiece 2. The hinge section 13 and its function are explained in detail with reference to FIG. 3.

FIG. 1 also depicts a hinge pin 12, whose sectional face is indicated by hatching in FIG. 1, whereby the cutting plane runs parallel to and at the same height as the cutting plane through the body 11 of the temple. The hinge pin 12 is accommodated in a throat 243 (see FIG. 2) of a hook-shaped hinge support 22 of the endpiece 2 and snapped in there. The snapping-in is described in detail under FIG. 2. The hinge pin 12 is not restricted to the round cross-section depicted here; the cross-section may have any shape. In the present exemplary embodiment according to FIG. 1, the hinge pin 12 of the temple 1 is pivotable relative to the endpiece 2, such that a round cross-section was selected in order to obtain a pivotable snapping-in of the hinge pin 12 on the endpiece 2.

According to FIG. 1, the endpiece 2 has a butt-strap 23 which cooperates with a corresponding stop face of the temple 1 to delimit an opening angle of the temple 1 relative to the endpiece 2. The endpiece 2 also has a pin 21 which can be inserted into a hole 31 in a lens 3 and can be secured there in order to attach the endpiece to the lens 3. In the present exemplary embodiment, the pin 21 is designed in one piece with the endpiece and glued to the lens 3. It is alternatively possible to replace the pin 21 with a screw or the like passing through the lens 3. The endpiece 2 may alternatively be varied such that it grips the lens 3 from both sides, i.e., between two extensions of the endpiece 2, and then is appropriately secured to the lens 3 by a screw, a rivet, glue with or without a pin, or by an insertion pin. The lens 3 may be made of all usual types of glass, plastic, or the like.

According to FIG. 1, the hook-shaped hinge support 22 is disposed such that the opening of the hook-shaped hinge support 22 opens outward to the side, i.e., to the side away from the head of the wearer. This orientation is preferred. It is likewise alternatively possible to have the opening on the opposite side, i.e., toward the head of the wearer, or toward the back. With the different position of the opening it is merely necessary to pay attention to or to orient the pivoting region of the temple 1 and the path of the butt-strap 23 appropriately.

FIG. 2 depicts the endpiece 2 which has the hook-shaped hinge support 22, the butt-strap 23, the pin 21, and a snap-in arrangement 24. The function and variations of the pin 21 for attachment of the endpiece 2 to a lens (not shown) have already been explained in detail with reference to FIG. 1 such that the corresponding applicable details may be referenced here.

FIG. 2 further depicts the snap-in arrangement 24 formed in the throat 243 of the opening of the hook-shaped hinge support 22 to accommodate the hinge pin (not shown in FIG. 2). Upon insertion of the hinge pin into the V-shaped opening of the hook-shaped hinge support 22, which, as an insertion slope, simplifies insertion, the hinge pin (not shown) arrives with elastic expansion of the free end 221 of the hook-shaped hinge support 22 behind the protrusions 241 and 242 into the throat 243 of the hook-shaped hinge support 22. When the hinge pin is seated in the throat 243, the free end 221 springs back into its original position, and the gap remaining between with protrusions 241 and 242 is narrow enough to hold the hinge pin in its working position.

At the same time, the throat 243 is dimensioned such that the hinge pin is held pivotably, possibly with appropriate play, in the throat 243.

The example described here presents a pivotable snapping-in of the hinge pin in the hinge support 22. If, for example, the hinge pin is to be held pivotably in the hinge section 13 of the temple, a non-pivotable snapping-in of the hinge pin in the hinge support is possible or the hinge pin may be solidly bonded with the endpiece-side hinge support by gluing, soldering, or the like.

The function of the aforementioned butt-strap 23 is explained in detail in the following with reference to FIG. 5.

FIG. 3 depicts a side view of the temple 1 of the arrangement of the temple and endpiece according to FIG. 1.

FIG. 3 also depicts the hinge pin 12, which, according to the invention, forms a predetermined breaking point for the hinge. In addition, FIG. 3 depicts the two hinge sections 13, which extend to continue the body 11 of the temple and hold the hinge pin 12 between them. The hinge sections 13 accommodate the hook-shaped hinge support 22 (see FIG. 2) between them. The hinge sections 13 limit movement of the temple 1 along the longitudinal axis of the hinge pin 12 relative to the hook-shaped hinge support, in that the faces of the hinge sections 13 facing each other abut the hinge support. Thus, the pivot plane of the temple 1 relative to the endpiece 2 is defined (see FIG. 1 and 2).

In the preferred exemplary embodiment depicted here, the hinge pin 12 is designed in one piece with the temple 1, i.e., the hinge pin 12 is solidly held on the hinge sections 13. Such a design of the temple 1 can be obtained, for example, by manufacturing the temple 1 along with the hinge sections 13 and the hinge pin 12 in the injection molding process. In the process, the position of a parting plane may be fixed in the injection mold such that the hinge pin 12 contains an injection seam at which the streams of material coming from the ends of the hinge pin flow against each other and come together. This process and the advantage obtained therewith are explained in the following in detail with reference to FIG. 4.

FIG. 4 depicts an enlarged view of the hinge end of the temple 1.

The advantage obtained resides in that a predetermined breaking point 122 of the hinge pin 12 can be produced if, during the injection molding process mentioned, the parting plane of the injection mold is positioned such that the feeding of the material to form the hinge pin 12 occurs roughly simultaneously from both ends of the molding cavity for the pin. In this case, the faces of the material flow together in roughly the center of the hinge pin being molded and form an inhomogeneity of the material there. This inhomogeneity of the material also represents a weakening of the hinge pin, which forms the predetermined breaking point 122 of the hinge pin 12. With a deliberate adjustment of the injection molding process, the strength at the point of inhomogeneity may be adapted to the desired fracture resistance of the predetermined breaking point 122. A suitable parting plane for the injection mold is a plane essentially parallel to the plane of the drawing in FIG. 4 which also includes the longitudinal axis of the hinge pin 12.

To obtain a deliberate introduction of the breaking strength into the predetermined breaking point 122 of the hinge pin 12, the hinge pin 12 has a surrounding radius 121, in its base zone, i.e., in its connection zone to the respective hinge section 13, which prevents undefined shearing of the hinge pin 12 at the base zone. The shearing of the hinge pin by the notching effect of an angular transition can also serve in principle as a predetermined breaking point for the hinge pin 12; with the procedure mentioned, i.e., to shift to the injection seam, the breaking process is more precisely defined. The reason for this becomes clear from the following explanation for FIG. 5, with reference to which the coordination of the butt-strap of the endpiece with the temple is explained.

FIG. 5 depicts the hinge end of the temple 1 in an enlarged view. According to FIG. 5, the temple 1 has a stop face 131 which is designed for coordination with the butt-strap 23 of the endpiece 2 (see FIG. 1 and 2). If the temple 1 is pivoted into its predefined opening angle adapted to the wearer of glasses, i.e., changed to a swiveled-out state, the stop face 131 comes into position against the butt-strap 23. If the temple 1 is now pivoted with an increased exertion of force beyond this predefined opening angle, a point of the stop face 131 touching the butt-strap 23 of the endpiece 2 becomes the center of rotation of the temple 1 relative to the endpiece 2. Now, the hinge pin 12, which is offset from the new center of rotation, is stressed at a right angle to its longitudinal axis. If this load in the hinge pin 12 reaches a fracture value of the hinge pin (predetermined breaking point), the hinge pin 12 breaks at the predetermined point and releases the temple 1. Consequently, the maximum force to be applied to the endpiece can be defined by the fracture resistance of the hinge pin 12.

The control of the fracture resistance of the hinge pin can, as previously mentioned, be achieved in different ways; suitable measures are, in particular: selection of material, dimensioning, and deliberate inhomogeneity of material.

That point on the butt-strap 23 (see FIG. 2), which the stop face 131 strikes in a swiveled-out state forms the center of rotation for the temple 1 in the swiveled-out state. The V-shaped opening of the hook-shaped hinge support 22 (see FIG. 2) is disposed such that the hinge pin 12, upon straining of the temple 1 beyond the swiveled-out state, is pulled into the undercut behind the protrusion 241 (FIG. 2). This measure causes the retaining force of the snap-in connection of the hinge pin 12 with the endpiece 2 to be able to be low since the temple 1 pivots in the swiveled-out state around the center of rotation and, consequently, stresses the hinge pin 12 in a direction different from the snapping-in or mating direction of the snap-in arrangement 24. The result is that the force with which the temple 1 in the swiveled-out state is held against the endpiece 2 is significantly greater than the force necessary for the mating of the snap-in arrangement 24. This design has the advantage that the wearer of the glasses can reliably hold them on the swiveled-out temple 1 without the temple 1 unexpectedly releasing from the endpiece. At the same time, the snap-in arrangement 24 can be designed such that a snapping-in of the hinge pin 12 is possible in a simple manner without damage to the hinge pin 12 at the predetermined breaking point.

In the exemplary embodiment depicted, only one hinge support and two hinge sections surrounding the hinge support are provided. Alternatively, a plurality of hinge supports positioned one over another in the direction of the longitudinal axis of the hinge pin, with which a corresponding number of hinge sections are associated, may be used. In other words, the hinge previously described in detail can also be disposed in multiples one over another.

Alternatively, the hinge pin may be provided on a single hinge section and extend up and down on both sides of the hinge section in the direction of the longitudinal of the hinge pin. Two of the previously described hook-shaped hinge supports may be associated as a counterpart to this hinge section such that the hook-shaped hinge supports accommodate the hinge section between them and are in each case snapped in with a section of the hinge pin.

The predetermined breaking point likewise remains in this case in the hinge pin, but will be in the vicinity of the base zone, i.e., in the zone of the connection of the hinge pin with the hinge section. In this arrangement, the hinge pin can likewise be provided either as a single component or in one piece with the hinge section and be accommodated either rotatably or non-rotatably in the hinge section. Accordingly, the hinge pin must then be disposed non-rotatably or rotatably in the hinge support.

The material for the hinge according to the invention may be selected from a large variety of materials. The use of plastics is preferred. This yields particular advantages when the hinge components are manufactured by injection molding. Alternatively, metal which may be processed either by die casting or other processes may be used.

The previously explained exemplary embodiment refers to rimless glasses. The invention is equally applicable to half-rim or full-rim frames. In contrast to rimless glasses, the frames at least partially surround the lenses to be held. These frames are also frequently very ornamentally designed such that a force acting on the endpiece can result in bending of the frame and to undesired release of the lenses if this were not prevented by the design of the hinge according to the invention.

We claim:

1. A breakaway hinge for eyeglasses for pivotable connection of a temple with an endpiece, said endpiece having a hinge support for receiving a hinge pin, and a hinge pin extending through said hinge support, said hinge pin being breakable to release the temple when an admissible force exerted on the endpiece by the temple is exceeded.

2. The breakaway hinge according to claim 1, wherein said hinge pin has a reduced diameter section at which said pin is breakable.

3. The breakaway hinge according to claim 2, wherein the hinge pin is injection molded and has an injection seam formed during the injection molding process, said pin being breakable at said seam.

4. The breakaway hinge according to claim 1, wherein the hinge pin is injection molded and has an injection seam formed during the injection molding process, said pin being breakable at said seam.

5. The breakaway hinge according to claim 1, characterized in that the hinge pin consists at least partially of a material with low strength.

6. The breakaway hinge according to claim 1, characterized in that the hinge support is designed in the shape of a hook and enables insertion of the hinge pin at a right angle to its central axis.

7. The breakaway hinge according to claim 6, characterized in that the hook-shaped hinge support has a snap-in arrangement to snap in the hinge pin.

8. The breakaway hinge according to claim 7, characterized in that the hook-shaped hinge support is formed on the endpiece and the hinge pin is disposed on the temple.

9. The breakaway hinge according to claim 8, characterized in that the hinge pin is formed in one piece with the temple.

10. The breakaway hinge according to claim 9, characterized in that a transition zone of the hinge pin into the temple has an enlarged radius which prevents shearing off of the hinge pin.

11. The breakaway hinge according to claim 10, characterized in that the temple has two hinge sections which accommodate the hook-shaped hinge support between them.

12. The breakaway hinge according to claim 11, characterized in that the hinge pin extends between the hinge sections of the temple.

13. The breakaway hinge according to claim 8, characterized in that the temple has two hinge sections which accommodate the hook-shaped hinge support between them.

14. The breakaway hinge according to claim 7, characterized in that the hinge pin is formed in one piece with the temple and that the temple has two hinge sections which accommodate the hook-shaped hinge support between them.

15. The breakaway hinge according to claim 6, characterized in that the hook-shaped hinge support is formed on the endpiece and the hinge pin is disposed on the temple.

16. The breakaway hinge according to claim 15, characterized in that the hinge pin is formed in one piece with the temple.

17. The breakaway hinge according to claim 15, characterized in that a transition zone of the hinge pin into the temple has an enlarged radius which prevents shearing off of the hinge pin.

18. The breakaway hinge according to claim 15, characterized in that the temple has two hinge sections which accommodate the hook-shaped hinge support between them.

19. The breakaway hinge according to claim 18, characterized in that the hinge pin is formed in one piece with the temple.

20. The breakaway hinge according to claim 18, characterized in that a transition zone of the hinge pin into the temple has an enlarged radius which prevents shearing off of the hinge pin.

21. The breakaway hinge of claim 1, characterized in that the endpiece has a butt-strap which cooperates with a stop designed on the temple to limit an opening angle of the temple.

22. The breakaway hinge according to claim 1, characterized in that the glasses are rimless glasses.

* * * * *